(12) United States Patent
Xu et al.

(10) Patent No.: US 7,915,869 B2
(45) Date of Patent: Mar. 29, 2011

(54) SINGLE STAGE STARTER/GENERATOR WITH ROTOR QUADRATURE AC EXCITATION

(75) Inventors: Ming Xu, Oro Valley, AZ (US); Cristian Anghel, Oro Valley, AZ (US); William Scherzinger, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 478 days.

(21) Appl. No.: 12/060,787

(22) Filed: Apr. 1, 2008

(65) Prior Publication Data

US 2009/0243417 A1 Oct. 1, 2009

(51) Int. Cl.
*H02P 9/10* (2006.01)
(52) U.S. Cl. .......................................... 322/59
(58) Field of Classification Search .............. 322/59, 322/28, 29, 17, 37, 46, 34
See application file for complete search history.

(56) References Cited

U.S. PATENT DOCUMENTS

| | | | |
|---|---|---|---|
| 4,735,975 A | 4/1988 | Iwata et al. | |
| 5,594,322 A * | 1/1997 | Rozman et al. | 322/10 |
| 5,714,821 A * | 2/1998 | Dittman | 310/179 |
| 5,850,138 A * | 12/1998 | Adams et al. | 322/68 |
| 6,188,204 B1 | 2/2001 | Vithayathil et al. | |
| 6,486,640 B2 * | 11/2002 | Adams | 322/59 |
| 7,005,833 B2 * | 2/2006 | Adams | 322/37 |
| 7,038,407 B2 | 5/2006 | Koch et al. | |
| 7,064,455 B2 * | 6/2006 | Lando | 290/1 C |

* cited by examiner

*Primary Examiner* — J Gon
*Assistant Examiner* — Iraj A Mohandesi
(74) *Attorney, Agent, or Firm* — Oral Caglar, Esq.

(57) ABSTRACT

When driven by a variable speed prime mover, a generator system provides relatively constant frequency AC power by independently controlling the main rotor flux rotational speed. The generator system includes an exciter stator that induces current in the exciter rotor windings at a desired frequency and phasing. The exciter rotor windings are electrically connected to and located in a common core as the main rotor windings to provide two-phase excitation current to the main rotor windings. The exciter stator winding is also located in a common core as the main generator stator windings. Excitation is supplied to the exciter stator from an exciter controller, which controls the frequency and phasing of the exciter excitation, based on the rotational speed and rotor position of the generator, to maintain a constant output frequency. The exciter frequency control function of the exciter controller may be eliminated when the generator system is driven by a constant speed prime mover or when a narrow band variable frequency output is required.

19 Claims, 6 Drawing Sheets

SINGLE STAGE STARTER/GENERATOR WITH ROTOR QUADRATURE AC EXCITATION

BACKGROUND OF THE INVENTION

The present invention relates to AC generators and, more particularly, to AC generators that are driven by mechanical rotational force exerted on a shaft of the AC generator, in order to provide either a constant frequency output from a variable speed input, an output having a frequency within a narrow range from a variable speed input, or a constant frequency output that is shifted in space and time from a constant speed input.

Many aircraft include AC starter/generator systems to supply relatively constant frequency AC power. Many of the AC starter/generator systems installed in aircraft include three separate brushless generators, namely, a permanent magnet generator (PMG), an exciter, and a main generator. The PMG includes a rotor having permanent magnets mounted thereon, and a stator having a plurality of windings. When the PMG rotor rotates, the permanent magnets induce AC currents in PMG stator windings. These AC currents are typically fed to a regulator or a control device, which in turn outputs a DC current to the exciter.

The exciter typically includes single-phase (e.g., DC) stator windings and multi-phase (e.g., three-phase) rotor windings. The DC current from the regulator or control device is supplied to exciter stator windings, and as the exciter rotor rotates, three phases of AC current are typically induced in the rotor windings. Rectifier circuits that rotate with the exciter rotor rectify this three-phase AC current, and the resulting DC currents are provided to the main generator. The main generator additionally includes a rotor and a stator having single-phase (e.g., DC) and multi-phase (e.g., three-phase) windings, respectively. The DC currents from the rectifier circuits are supplied to the rotor windings. Thus, as the main generator rotor rotates, three phases of AC current are induced in main generator stator windings. This three-phase AC current can then be provided to a load such as aircraft electrical systems.

Many of these AC starter/generator systems are driven by variable speed prime movers. For example, many generators are driven by the aircraft engines, which may vary in rotational speed during operation. Thus, to ensure the AC generators supply relatively constant frequency AC power, many aircraft include a hydro-mechanical transmission, or other type of gear arrangement, that converts the variable engine speed to a relatively constant rotational speed.

Although the above-described configuration is generally safe, hydro-mechanical transmissions can be relatively large, heavy, and complex, and they may also exhibit relatively poor reliability. Each of these factors can lead to increased overall aircraft, fuel, and maintenance costs, and/or increased maintenance frequency, which can further lead to increased costs.

One solution, proposed by both U.S. Pat. No. 6,188,204 to Vithayathil et al and U.S. Pat. No. 7,064,455 to Lando, employs three-phase windings for both main generator rotor and exciter generator rotor in order to control the main generator rotating field frequency and output frequency. The starter/generator system described in this disclosure employs two-phase windings for exciter and main generator rotor which greatly reduces the complexity and provides more flexibility to the starter/generator construction.

As can be seen, there is a need for a system and method of supplying relatively constant frequency AC power from a generator that is driven by a variable speed prime mover. There is also a need for a system that is a relatively small, lightweight, less complex, and more reliable, as compared to current systems and methods, and that does not rely on specified numbers of exciter and main generator poles.

SUMMARY OF THE INVENTION

In one aspect of the present invention, a generator system comprises a main generator having a main generator rotor and a main generator stator, the main generator rotor with a plurality of main generator rotor windings wound thereon, the main generator stator with a plurality of main generator stator windings wound thereon; and an exciter having an exciter rotor and an exciter stator, the exciter rotor having exciter rotor windings wound thereon, the exciter stator having exciter stator windings wound thereon; wherein the exciter rotor and main generator rotor are contained in a common rotor core and the exciter stator and the main generator stator are contained in a common stator core.

In another aspect of the present invention, a generator system comprises a main generator having a main generator rotor and a main generator stator, the main generator rotor with a plurality of main generator rotor windings wound thereon, the main generator stator with a plurality of main generator stator windings wound thereon; and an exciter having an exciter rotor and an exciter stator, the exciter rotor having exciter rotor windings wound thereon, the exciter stator having exciter stator windings wound thereon; wherein the exciter rotor and main generator rotor are contained in a common rotor core and the exciter stator and the main generator stator are contained in a common stator core; wherein the exciter rotor is configured to provide two phase excitation current to the main generator rotor windings; and wherein the main generator rotor windings have two phases.

In a further aspect of the present invention, a generator system comprises a housing; a drive shaft rotationally mounted within the housing and receiving power from a prime mover, wherein the drive shaft rotates at a variable rotational speed; a main generator stator mounted within the housing and having a plurality of main generator stator windings wound thereon; a main generator rotor mounted on the drive shaft and disposed within the main generator stator, the main generator rotor having a plurality of main generator rotor windings wound thereon configured to receive a two-phase excitation current, wherein the main generator rotor windings generate an air gap flux upon electrical excitation thereof; an exciter rotor mounted on the drive shaft, the exciter rotor having a plurality of exciter rotor windings wound thereon, the exciter rotor windings electrically connected to the main generator rotor windings and configured, upon electrical excitation thereof, to provide the two-phase electrical excitation to the main generator rotor windings; an exciter stator surrounding the exciter rotor, the exciter stator having a plurality of exciter stator windings wound thereon, the exciter stator windings configured, upon electrical excitation thereof, to electrically excite the exciter rotor windings; a speed signal source configured to supply a speed signal representative of the rotational speed of the drive shaft; and an exciter controller electrically coupled to the exciter stator windings and coupled to receive the speed signal, the exciter controller configured, in response to the speed signal, to determine the rotational speed of the shaft and to responsively supply electrical excitation to the exciter stator windings that results in the main generator rotor windings generating the air gap flux at a substantially constant, predetermined frequency, and wherein the exciter rotor and main generator rotor are contained in a common rotor core and the exciter stator and the main generator stator are contained in a common stator core.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides various configurations of an alternating current (AC) starter/generator that may use independently controlled field rotational speeds to supply (1) relatively constant frequency AC voltages under varying mechanical rotational speeds, (2) relatively constant frequency AC voltages under relatively constant mechanical rotational speeds that may be different than the synchronous speed, and (3) variable frequency (VF) AC voltages under variable mechanical rotational speeds, where the VF range is smaller than the synchronous speed range. More specifically, the starter/generator system described herein may employ the use of two-phase current to transfer energy from the exciter rotor to the main generator rotor, whereas in the prior art, three-phase current is used. By using two-phase instead of three-phase power transfer between the rotors, a simple winding scheme for the rotor poles can be used, which greatly reduces the complexity of the general construction of the generator.

Furthermore, the starter/generator system described herein may include both the exciter and main generator rotor windings being wound on the same rotor core, and both exciter and main generator stator windings being wound on the same stator core. In this configuration, the rotor core and the stator core may each contain exciter and main generator windings. Unlike conventional systems, which may require separate mechanical packaging of the exciter and the main generator, the present invention provides the exciter's and the main generator's windings within a single mechanical packaging, thereby providing an electrical machine that is more compact and significantly simpler.

Figure 1:
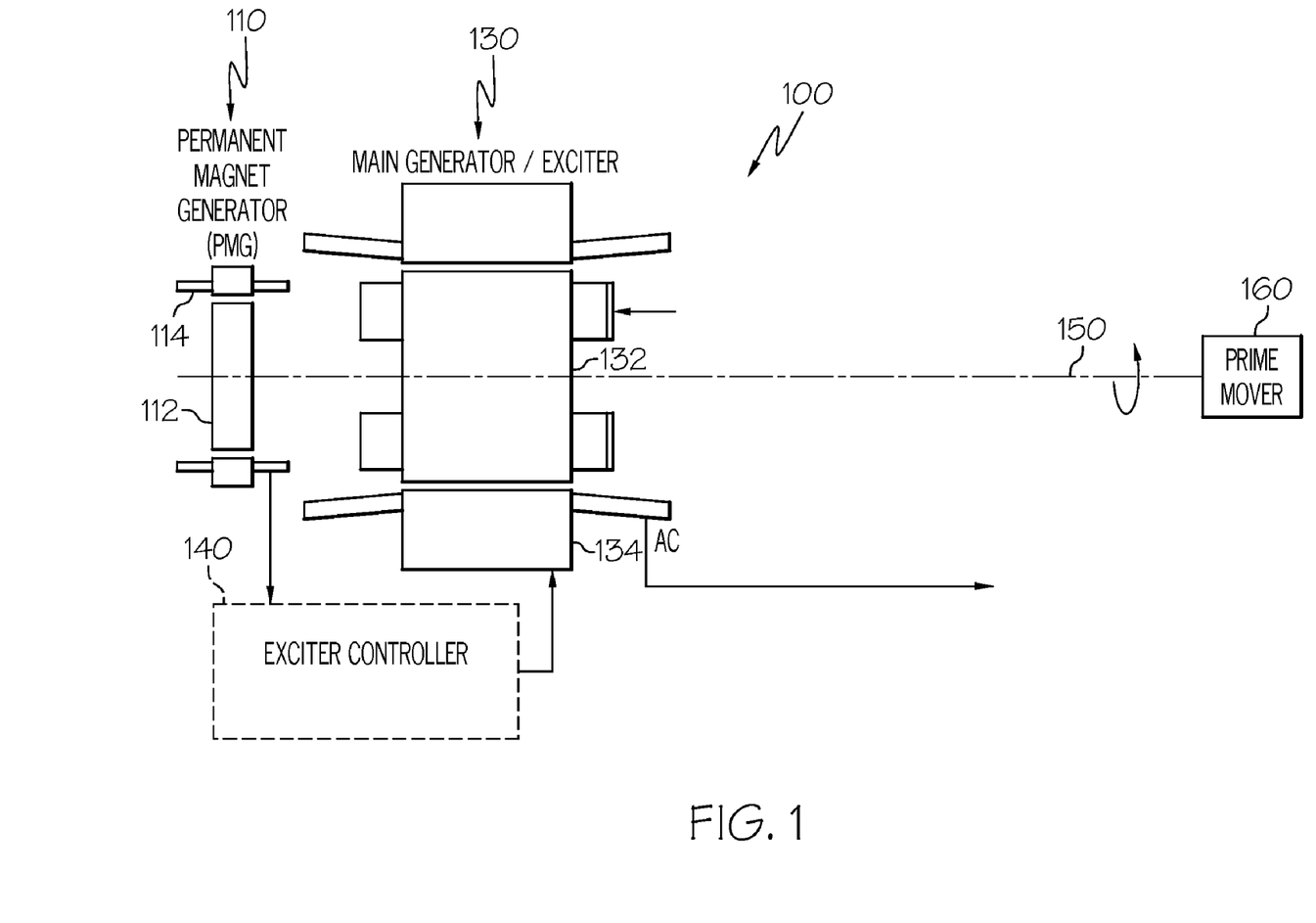
FIG. 1 is a block diagram of an exemplary starter/generator system according to an embodiment of the present invention.

Turning now to the description and with reference first to FIG. 1, a schematic block diagram of an exemplary starter/generator system 100 for use with, for example, an aircraft gas turbine engine, is shown. This exemplary starter/generator system 100 may include a permanent magnet generator (PMG) 110, a main generator/exciter 130 and an exciter controller 140. It will be appreciated that the starter/generator system 100 may also include one or more additional components, sensors, or controllers. However, a description of these additional components, sensors, and controllers, if included, is not necessary for a description of the invention, and will therefore not be further depicted or described.

In the depicted embodiment, a PMG rotor 112 of the PMG 110 and a main generator/exciter rotor 132 of the main generator/exciter 130 may be mounted on a common drive shaft 150. The drive shaft 150 may receive a rotational drive force from a prime mover 160, such as an aircraft gas turbine engine (not shown), which may cause the PMG rotor 112 and the main generator/exciter rotor 132 to rotate at the same rotational speed. As noted before, the rotational speed of the prime mover 160, and thus these starter/generator system components, may vary. For example, in one embodiment described in more detail below, the rotational speed may vary within a range of about 1,200 rpm to about 4,800 rpm. It will be appreciated that this rotational speed range may be merely exemplary, and that various other speed ranges may be used without departing from the scope of the invention.

Regardless of the specific rotational speed range, as the PMG rotor 112 rotates, the PMG 110 may generate and supply AC power to the exciter controller 140 from a PMG stator 114. In response, the exciter controller 140 may be electrically coupled to an exciter stator (see FIG. 3) of the main generator/exciter 130 to supply AC power to the exciter stator. In turn, this may induce the exciter rotor (see FIG. 3) to supply an induced alternating current to a main generator rotor (see FIG. 3). As the main generator rotor rotates, it may induce AC current in a main generator stator (see FIG. 3), which may be, in turn, supplied to one or more loads. While FIG. 1 simply shows the main generator/exciter 130 as a single unit (one mechanical packaging), within this mechanical packaging, as shown in FIG. 3 and as described in detail below, the main generator/exciter 130 may include exciter and main generator rotor windings on one single core (rotor core) and exciter and main generator stator windings on another single core (stator core).

Figure 2:
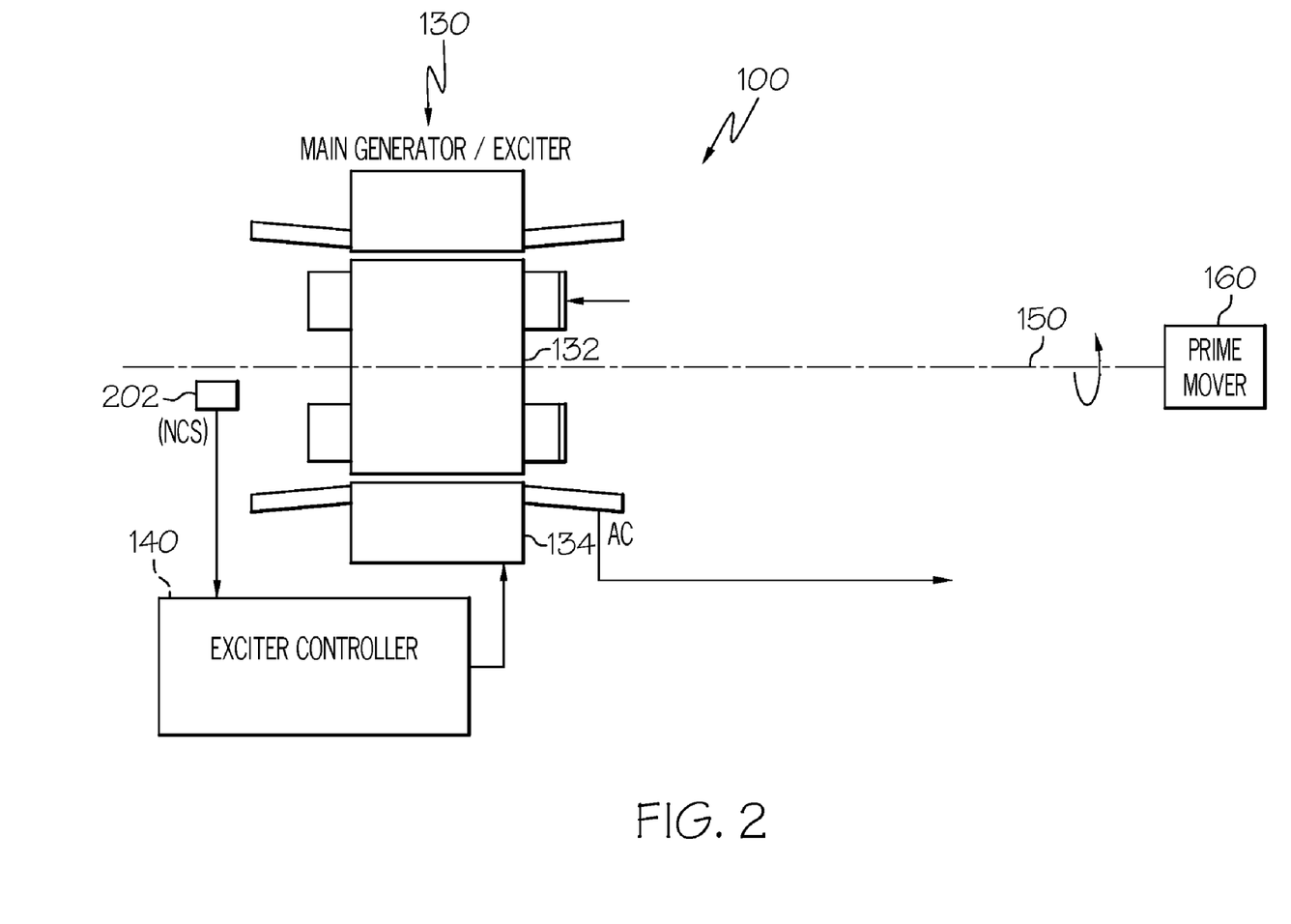
FIG. 2 is a block diagram of an exemplary starter/generator system according to an alternative embodiment of the present invention.

Although the starter/generator system 100 described above may be implemented with a PMG 110, the starter/generator system 100 could alternatively be implemented with other devices in place of the PMG 110, which respond to the rotational speed of the drive shaft 150. In such an alternative embodiment, as shown in FIG. 2, the starter/generator system 100 may include a speed sensor 202 rather than the PMG 110. The speed sensor 202, which may be implemented using any one of numerous types of rotational speed sensors, may be configured to sense the rotational speed of the drive shaft 150 and supply a speed signal (NCS) representative of the rotational speed of the drive shaft 150 to the exciter controller 140. The exciter controller 140 may use this speed signal NCS to modulate an energy source (not shown) that is independent of the AC starter/generator system 100, e.g. another generator associated with the prime mover but decoupled from the shaft, or a battery-operated generator. Although the exciter controller 140 in this alternative embodiment may also supply AC power to the exciter stator 122, it may do so in response to the speed signal from the speed sensor 202 rather than in response to the AC power supplied from the PMG 110, the frequency of which may be indicative of the rotational speed of drive shaft 150. In yet another embodiment (not shown), the exciter controller 140 may use a frequency signal from main generator stator windings (see FIG. 3) to determine the correct input frequency to the exciter stator windings (see FIG. 3) to achieve the predetermined constant output frequency at the main generator/exciter 130. In all embodiments, however, it should be noted that the signal supplied to the exciter controller 140, regardless of whether it is the AC power signal from the PMG 110 or the speed signal from the speed sensor 202, may be representative of shaft rotational speed.

Figure 3:
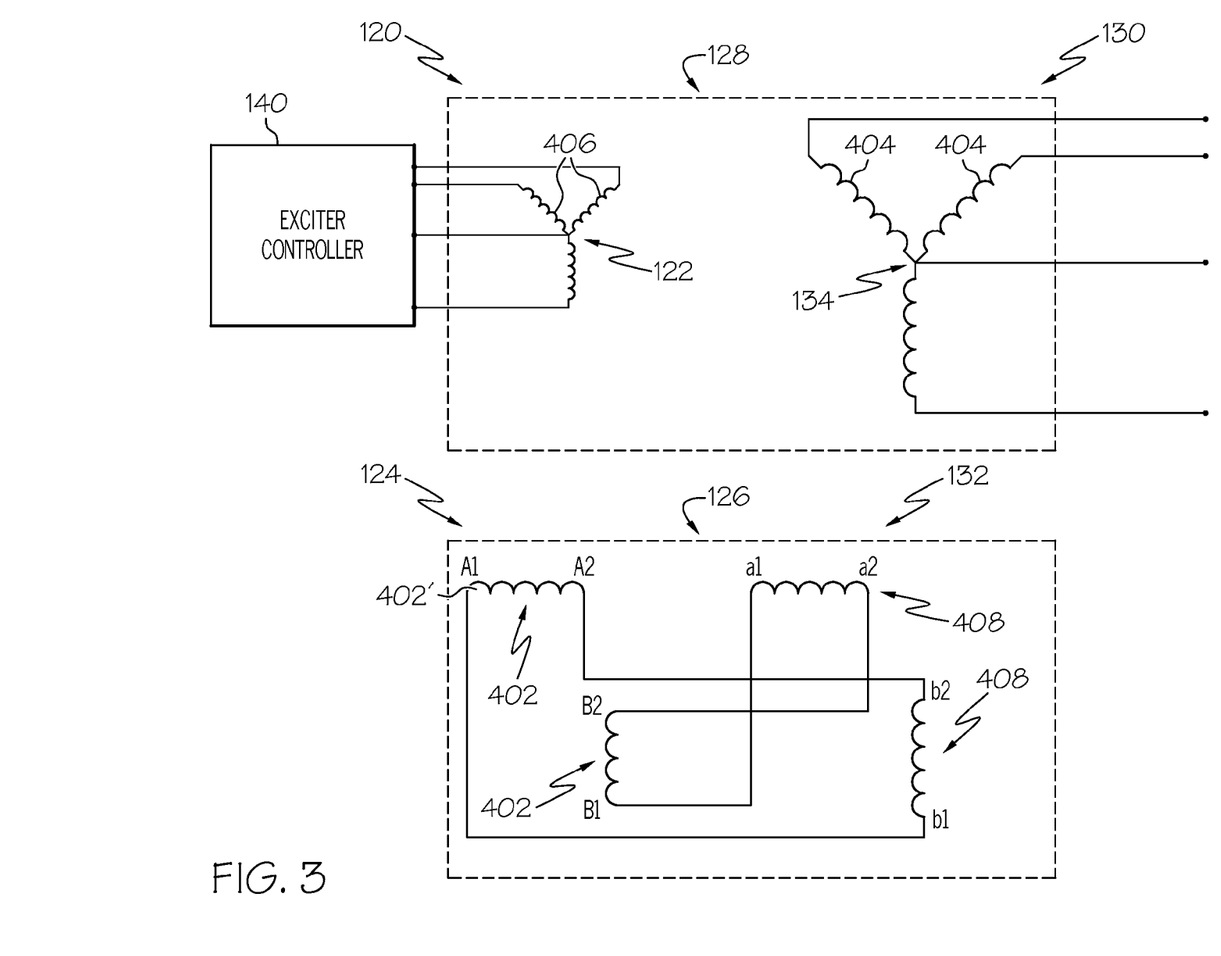
FIG. 3 is a schematic representation of an embodiment of the starter/generator system of the present invention.
Figure 4:
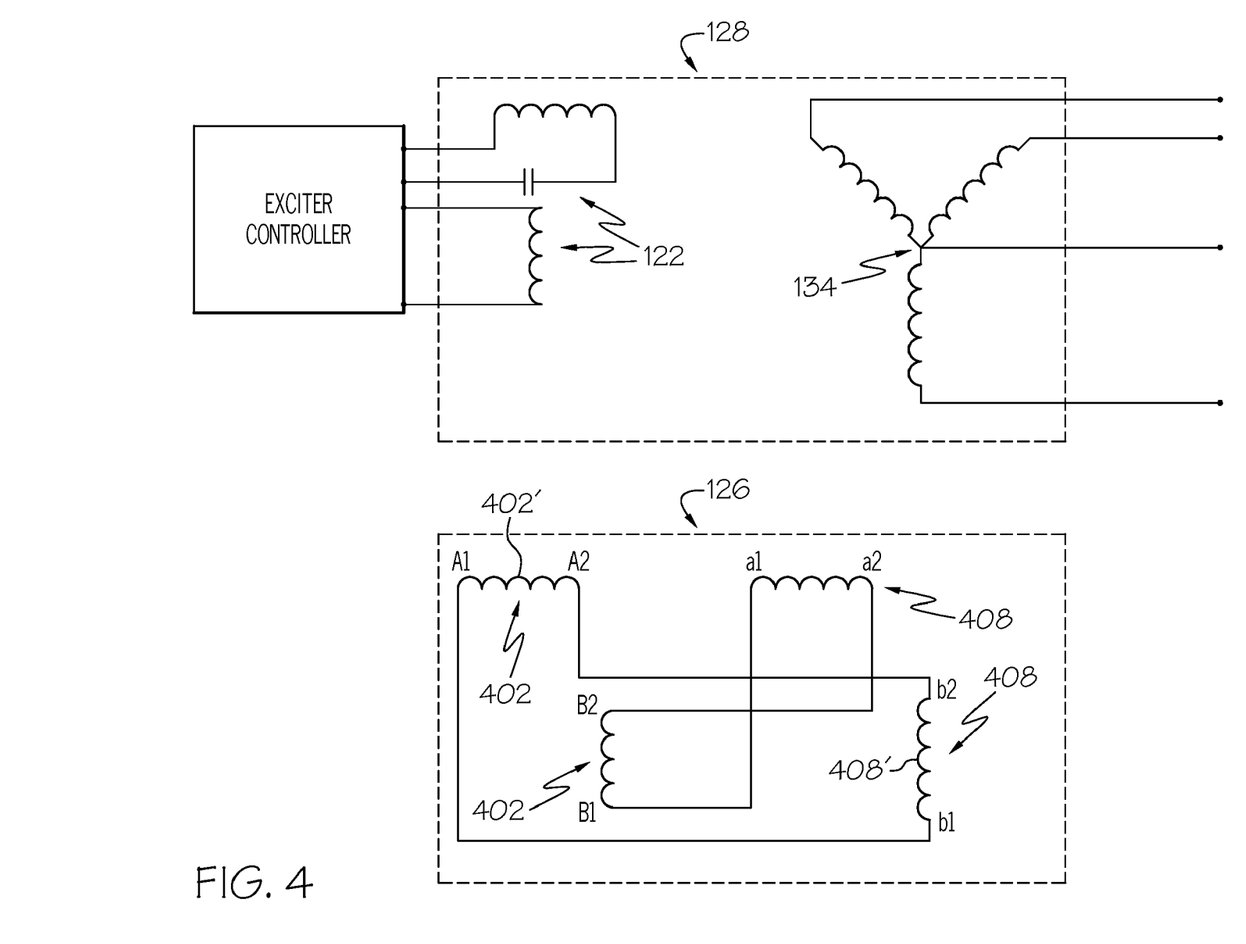
FIG. 4 is a schematic representation of another embodiment of the starter/generator system of the present invention.

Referring now to FIG. 3, it may be seen, for example, that an exciter rotor 124 and a main generator rotor 132 may be configured differently from conventional brushless AC generator systems, and an exciter stator 122 and a main generator stator 134 may also be configured differently from conventional brushless AC generator systems. In particular, the exciter rotor 124 and the main generator rotor 132 may be implemented with two phase exciter rotor windings 402 and two phase main rotor windings 408 respectively. Each of these two phase windings may be configured to be shifted by a value in a range of from 80 electrical degrees to 100 electrical degrees in time and in space, with 90 electrical degrees being a typical amount. Conversely, the exciter stator 122 may be implemented with three phase exciter stator windings 406 as shown in FIG. 3 or two phase exciter stator windings 406 as shown in FIG. 4, while the main generator stator 134 may be implemented with standard three phase main generator stator windings 404. It will be appreciated that because of the common core configuration the exciter stator 122 and main stator 134 may be not distinguishable; the exciter rotor 124 and main rotor 132 may be not distinguishable either. A slotted cylindrical stator and rotor core configuration is typical, but salient pole configuration can also be used as an alternative.

Another difference from conventional brushless AC generator systems may be that there may be no rotating rectifier assemblies coupled between the exciter rotor 124 and the main rotor 132. Rather, the exciter rotor windings 402 may be directly coupled to the main generator rotor windings 408. Note that the exciter can be operated in at least three different modes, namely, sub-synchronous mode (negative phase sequence), sup-synchronous mode (positive phase sequence), and synchronous mode (DC current), while the main generator may typically be operated in either sub-synchronous mode or sup-synchronous mode. The main generator cannot operate at synchronous mode. When the shaft speed is above, equal to, or under the synchronous speed of the starter/generator system, the exciter generator operating mode is called super-synchronous, synchronous and sub-synchronous respectively. When the shaft speed is above or under the synchronous speed of the main generator, the main generator operating mode is called super-synchronous or sub-synchronous respectively. For example, for a constant 400 Hz starter/generator system with a 4-pole main generator and a 2-pole exciter generator, the synchronous speed for the system is 8000 rpm, while the synchronous speed for the main generator is 12000 rpm, therefore the exciter is at sub-synchronous mode when running below 8000 rpm; synchronous mode at 8000 rpm and super-synchronous mode above 8000 rpm. The main generator is always running at sub-synchronous mode if the shaft speed is below 12000 rpm. Any combination of these operating modes by the exciter and the main generator may be used without departing from the scope of the invention.

Still another difference from conventional brushless AC generator systems may be that the exciter rotor 124 and the main generator rotor 132 of the present invention may be housed in a common rotor core 126. Similarly, the exciter stator 122 and the main generator stator 134 of the present invention may be housed in a common stator core 128. The exciter stator 122, main generator stator 134, exciter rotor 124 and main generator rotor 132 may share the same housing and shaft 150.

Figure 5:
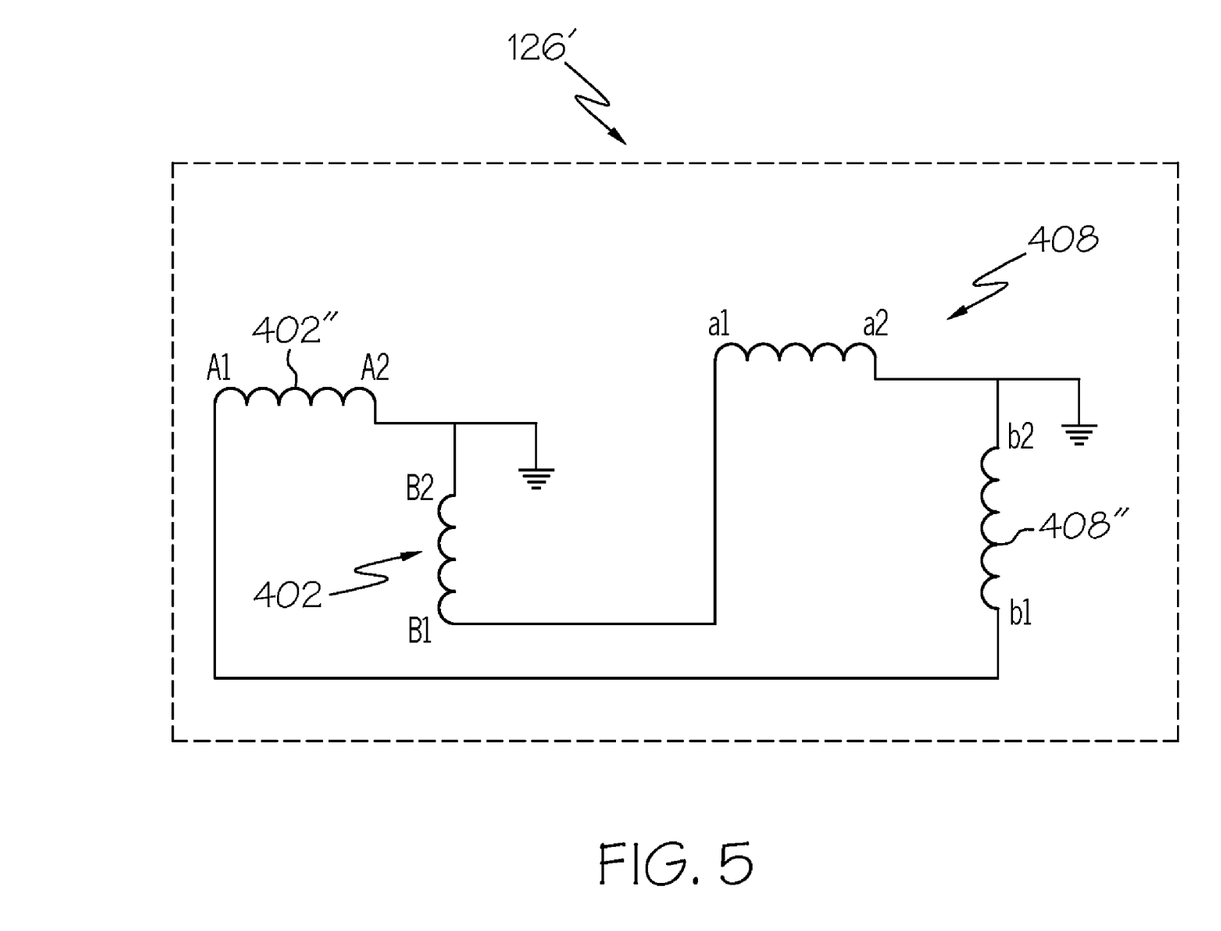
FIG. 5 is a schematic representation of another embodiment showing the rotor winding connection on the common rotor core of the starter/generator system of the present invention.

The winding design for the common rotor core 126 and the common stator core 128 may be such that the main generator rotor and stator windings 408, 404 and the exciter rotor and stator windings 402, 406 will not be magnetically coupled or allowed to "cross-talk" to each other while sharing the same core. The winding design of the common rotor core 126 may be designed as shown, for example, in FIG. 3, wherein the both sides (A1 and A2) of one phase winding 402' of the exciter rotor winding 402 may be coupled to both legs (b1 and b2) of one phase winding 408' of the main generator rotor winding 408. Alternatively, a common rotor core 126' may be designed as shown in FIG. 5, wherein one side (A1) of one phase winding 402" of the exciter rotor winding 402 may be coupled to one leg (b1) of one phase winding 408" of the main generator rotor winding 408. The other leg (A2) of the phase winding 402" may be grounded as shown in FIG. 5.

In both embodiments shown in FIG. 4 and FIG. 5, the connecting phase sequence is reversed; the leading phase of exciter rotor winding 402 may be connected to the lagging phase of main rotor winding 408, and vice versa. This reverse phase sequence connection may give better energy conversion although the same phase sequence connection would also work for this concept.

The exciter controller 140 may be implemented, at least in part, as a power converter circuit that is configured, in response to the signal supplied to it from either the PMG 110, the speed sensor 202, or main generator stator windings 404, to supply variable-frequency, three-phase excitation to the exciter stator windings 406, as shown in FIG. 3, with either a relatively positive or negative phase sequence, or DC in case of synchronous operating mode. Alternatively, the exciter controller 140 may be implemented to supply variable frequency, two-phase excitation to the exciter stator windings 406, as shown in FIG. 4. In either case, the exciter rotor windings 402 may be configured to provide two phase excitation current to the main generator rotor windings 408. These two phase windings may be shifted by 90 electrical degrees in time and in space. It may be appreciated that relatively negative phase sequence excitation, as used herein, is excitation that is supplied in a direction opposite that which the exciter rotor 124 is rotating, and relatively positive sequence excitation, as used herein, is excitation that is supplied in a direction the same as which the exciter rotor 124 is rotating.

As will be described below, the excitation frequency and phase sequence that the exciter controller 140 may supply to the exciter stator windings 406 may depend upon the rotational speed at which the prime mover 160 is rotating the drive shaft 150 (and thus the PMG rotor 112, the exciter rotor 124, and the main generator rotor 132), upon the number of poles with which the exciter 120 and the main generator 130 are implemented, and upon the desired frequency that the starter/generator system 100 is to supply. The general formula for calculating the characteristic frequency with DC excitation may be given as follows:

$$F = NsP/120$$

where F is the frequency produced, Ns is the rotational speed of the drive shaft 150, and P is the number of generator poles. In the depicted embodiment of FIG. 2, the prime mover 160 may be configured to rotate the shaft 150 at a rotational speed (Ns) of between about 5000 rpm and about 11000 rpm, the exciter 120 may be implemented as a 2-pole exciter and the main generator 130 may be implemented as a 4-pole generator, and the desired constant output frequency from the starter/generator system 100 may be 400 Hz.

A description will now be provided as to how the above-described starter/generator system 100, with the above-noted over 2:1 speed variation, the 2-pole exciter 120, and the 4-pole main generator 130, can generate AC power at a constant frequency of 400 Hz. Before doing so, however, it will be appreciated that this speed variation, exciter implementation, main generator implementation, and constant output frequency are merely exemplary. Indeed, the starter/generator system 100 could be driven at over any one of numerous rotational speed ranges, it could be configured with exciters and/or main generators having any one of numerous other numbers of poles, and it could be configured to generate AC power at any one of numerous other constant frequency values.

Turning now to the description, when the prime mover 160 is rotating the drive shaft 150 at 5000 rpm, the PMG 110 or the speed sensor 202 may supply a signal representative of this rotational speed to the exciter controller 140. The 2 pole exciter rotor would generate a characteristic frequency F=(5000×2)/120 Hz, or 83.3 Hz if the excitation current in the exciter stator winding 406 were DC. In reality the exciter controller 140 may supply the exciter stator windings 406 with 150 Hz, negative sequence, three-phase excitation. The 2-pole exciter rotor 124, in response to this excitation, may generate rotor current at a frequency which is the sum of the excitation frequency and the characteristic frequency, or (83.3+150) Hz, or 233.3 Hz.

Similarly, a 4-pole, main generator would have a characteristic frequency of 166.7 Hz ((5000×4)/120)). Since the main generator rotor 132 is excited by a frequency of 233.3 Hz, then the main generator rotor 132 may generate a main generator air gap flux at a frequency of (166.7+233.3) Hz, or 400 Hz. Thus, the generator stator 134 may supply AC current at 400 Hz.

It will be appreciated that the 83.3 Hz frequency to which the 150 Hz excitation frequency is added is the frequency the exciter rotor 124 would generate at a rotational speed of 5000 rpm, if the exciter stator windings 406 were supplied with DC excitation. Similarly, if the 4-pole main generator rotor 132 were supplied with DC excitation, as in a conventional brushless AC generator, the generated air gap flux at a rotational speed of 5000 rpm would be 166.7 Hz. However, since the main generator rotor 132 is, by virtue of its connection to the exciter rotor 124, being supplied with AC excitation at a frequency of 233.3 Hz, the resultant main generator air gap flux is instead (166.7+233.3) Hz, or 400 Hz.

The general formula for desired frequency Fc from exciter controller can be written as:

$$Fc = NsN/120 \pm NsM/120 - Fo$$

where N is the number of main generator poles; M is the number of exciter generator poles; and Fo is the predetermined output frequency at the main generator stator terminals. The choice of the plus or minus sign depends on the way the two rotor windings are connected to each other, and the sign is positive if they have opposite or additive phase sequence. In the above example, Fo=400 Hz, N=4, M=2, Ns=5000 rpm, so Fc=5000*4/120+5000*2/120−400=−150 Hz, indicating a negative sequence 150 Hz is needed to supply the exciter stator windings 406 in order to generate 400 Hz at the main generator when rotating at 5000 rpm.

Likewise, when the prime mover 160 is rotating the drive shaft 150 at 11000 rpm, the PMG 110 or the speed sensor 202 may supply a signal representative of this rotational speed to the exciter controller 140. In response, the exciter controller 140 may supply the exciter stator windings 406 with 150 Hz, positive sequence, three-phase excitation. The 150 Hz positive sequence frequency can also be determined by using the above general formula Fc=11000*4/120+11000*2/120−400=150 Hz. The 2-pole exciter rotor 124, in response to this excitation, may generate rotor current at a frequency of (183.3-150) Hz, or 33.3 Hz, and the main generator rotor 132 may generate a main generator air gap flux at a frequency of (33.3+366.7) Hz, or 400 Hz. Thus, the generator stator 134 may continue to supply AC current at 400 Hz.

It will once again be appreciated that the 183.3 Hz frequency from which the 150 Hz is subtracted is the frequency the exciter rotor 124 would generate at a rotational speed of 11000 rpm, if the exciter stator windings 406 were supplied with DC excitation. And again, if the 4-pole main generator rotor 132 were supplied with DC excitation, the generated air gap flux at a rotational speed of 11000 rpm would be 366.7 Hz.

Figure 6A:
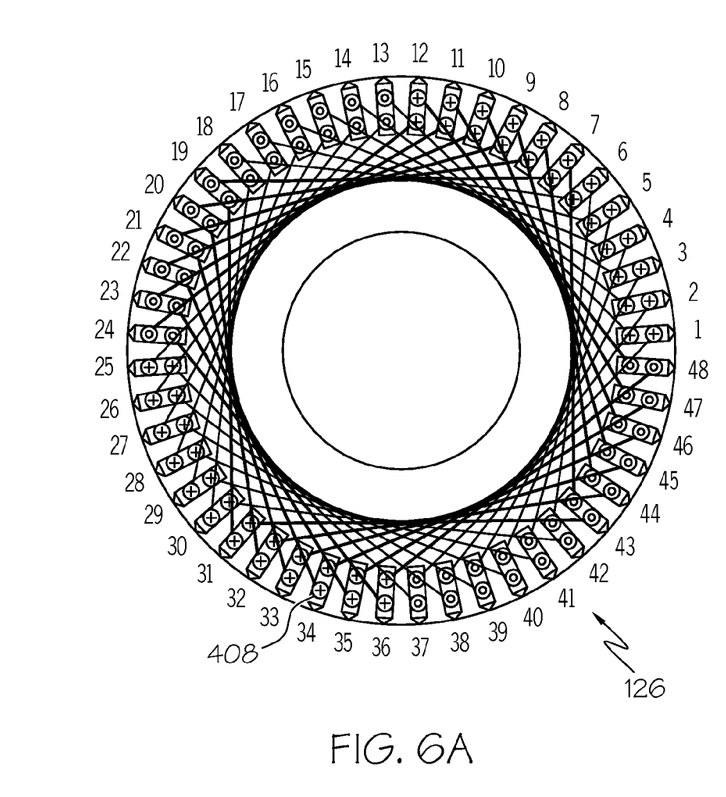
FIG. 6 is schematic representation of a common rotor core with both exciter rotor winding and main rotor winding wound thereon.
Figure 6B:
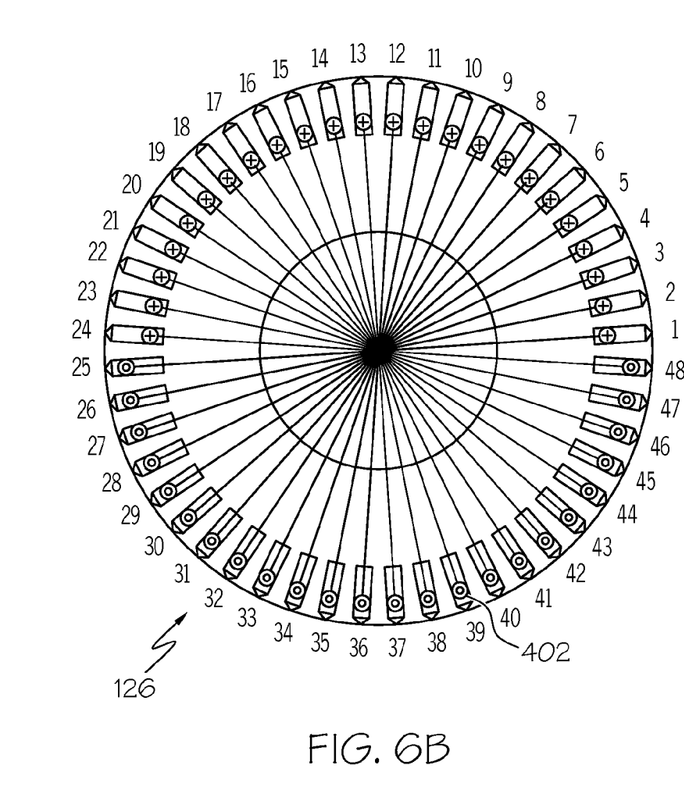

Referring to FIG. 6, a common rotor 126 of a main/exciter generator may be seen, where the particular configuration may include a 4 pole, two-phase main generator rotor. It will be further appreciated that both slotted cylindrical main rotor configuration and salient pole rotor configuration may be employed to accommodate the two phase main generator rotor winding 408 and exciter rotor winding 402 to provide 90 electrical degrees displacement in space and time. The principles described in the invention apply equally to the cylindrical or salient pole main rotor configurations.

Referring again to FIG. 1 and FIG. 2, it should be recognized that the invention may be configured for use when the prime mover 160 rotates the drive shaft 150 at a constant speed. In such a configuration, the frequency control function of the exciter controller 140 may be eliminated. Such a situation may arise in an aircraft with a conventional transmission apparatus that is appropriately geared to reduce and control the rotational speed of the drive shaft 150. For example, if the drive shaft 150 were configured to rotate at a speed of 5000 rpm, then a starter/generator system 100 may be provided that has an exciter 120 with a fixed negative sequence excitation of 150 Hz, a 4 pole main generator 130, and a 2 pole exciter 120, in order to produce an constant output of 400 Hz. Such a configuration may eliminate the requirement for diodes and rectifiers mounted within the exciter and thus would be simpler to manufacture and maintain. It should be noted that in practice the phrase "constant speed" may provide for a tolerance within which the speed varies, but this tolerance is normally very narrow; an acceptable tolerance may usually be about 1% of the constant speed value within which the rotational speed may vary and still be considered as constant.

Similarly, if the prime mover 160 rotates within a range that is bound between fixed upper and lower limits, then the output of the main generator 130 would be similarly bound within a known frequency range having fixed upper and lower limits, the precise bound and limits depending on specific machine design. For example, if the prime mover 160 rotates the drive shaft 150 at speeds of 5000 rpm to 10000 rpm, then the starter/generator system 100 of the invention may be configured as in the previous paragraph with a fixed 150 Hz negative sequence excitation to exciter stator windings 404, according to the general formula regarding frequency calculation described earlier. The output frequency would be bound between 400 Hz and 650 Hz, not 400 Hz and 800 Hz as would be the case with a conventional synchronous generator. The narrower frequency band obtained by this system may create a narrower variable frequency or VF system that may benefit all electric power utilization equipment in the aircraft, in addition to the previously claimed benefit of increased reliability due to elimination of rotating diodes and associated parts.

Thus, it may be seen that the AC starter/generator system described herein may supply relatively constant frequency AC power when the generator is driven by a variable speed prime mover, by independently controlling the field rotational speeds. The disclosed starter/generator system can be implemented with no restrictions on the number of poles for the exciter or main generator.

It should be understood, of course, that the foregoing relates to exemplary embodiments of the invention and that modifications may be made without departing from the spirit and scope of the invention as set forth in the following claims.

We claim:

1. A generator system comprising:
a main generator having a main generator rotor and a main generator stator, the main generator rotor with a plurality of main generator rotor windings wound thereon, the main generator stator with a plurality of main generator stator windings wound thereon;
an exciter having an exciter rotor and an exciter stator, the exciter rotor having a plurality of exciter rotor windings wound thereon, the exciter stator having a plurality of exciter stator windings wound thereon; and
a speed and rotor position signal source mounted on a shaft and configured, upon rotation thereof, to provide at least one of a speed and a rotor position signal to an exciter controller, the speed and rotor position signal being representative of the rotational speed and position of the shaft;
wherein the exciter controller determines the rotational speed of the shaft based at least in part on the speed signal, wherein the exciter controller determines the rotor position based at least in part on the rotor position signal,
wherein the exciter controller provides electrical excitation having a supply amplitude, a frequency, and a phase sequence based at least in part on the speed and rotor position signal,
wherein the main generator rotor windings and the exciter rotor windings each have two phases, and
wherein the exciter rotor windings and main generator rotor windings are wound on a common rotor core and the exciter stator and the main generator stator are wound on a common stator core.

2. The generator system of claim 1, wherein the exciter rotor is configured to provide two phase excitation current to the main generator rotor windings.

3. The generator system of claim 2, wherein:
the main generator rotor and the exciter rotor are configured to rotate in a first direction at a variable rotational speed;
the electrical excitation supplied to the exciter stator is multi-phase excitation having a phase sequence; and
an exciter controller supplies the multi-phase electrical excitation to the exciter stator windings in the phase sequence that is in either the first direction or a second direction opposite the first direction.

4. The generator system of claim 3, wherein the exciter rotor windings and the main generator rotor windings have a phase shift in space and time.

5. The generator system of claim 3, wherein the electrical excitation supplied to the exciter stator is AC excitation.

6. The generator system of claim 3, wherein the electrical excitation supplied to the exciter stator is DC excitation.

7. The generator system of claim 4, wherein the amount of phase shift is a value within a range of about 80 electrical degrees to about 100 electrical degrees.

8. The generator system of claim 7, wherein the amount of phase shift is 90 electrical degrees.

9. The generator system of claim 1, wherein the exciter controller receives a speed signal Ns from a device that senses the speed of a shaft, wherein the device is selected from the group consisting of a permanent magnet generator, a sensor, and the main stator windings voltages or currents, or both voltages and currents when a sensorless method is used.

10. The generator system of claim 1, wherein the exciter controller receives the rotor position signal from a device that senses the rotor position wherein the device is selected from the group consisting of the permanent magnet generator, a sensor, and the main stator windings voltages or currents, or both voltages and currents when a sensorless method is used.

11. The generator system of claim 1, further comprising:
a sensor configured to sense the rotation of the shaft and supply at least one of the rotor position signal and speed signal representative thereof to the exciter controller, the speed and rotor position signal being representative of the rotational speed and position of the shaft.

12. The generator system of claim 1, further comprising:
a sensorless method configured to sense the rotation of the shaft and supply at least one of the rotor position and speed signal representative thereof to the exciter controller, the speed and rotor position signal being representative of the rotational speed and position of the shaft.

13. The generator system of claim 11, wherein the main generator rotor and the exciter rotor and permanent magnet generator rotor are disposed to rotate about a common shaft.

14. The generator system of claim 1, wherein the exciter rotor windings and the main generator rotor windings are wound around cores of a type selected from a group consisting of salient cores and cylindrical cores.

15. A generator system comprising:
a main generator having a main generator rotor and a main generator stator, the main generator rotor with a plurality of main generator rotor windings wound thereon, the main generator stator with a plurality of main generator stator windings wound thereon;
an exciter having an exciter rotor and an exciter stator, the exciter rotor having a plurality of exciter rotor windings wound thereon, the exciter stator having a plurality of exciter stator windings wound thereon; and
one of a sensor and a sensorless method configured to sense the rotation of a shaft and supply at least one of the rotor position signal and speed signal representative thereof to an exciter controller, the speed and rotor position signal being representative of the rotational speed and position of the shaft,
wherein the exciter controller determines the rotational speed of the shaft based at least in part on the speed signal;
wherein the exciter controller determines the rotor position based at least in part on the rotor position signal;
wherein the exciter controller provides electrical excitation having a supply amplitude, a frequency, and a phase sequence based at least in part on the speed and rotor position signal;
wherein the exciter rotor windings and main generator rotor windings are wound on a common rotor core and the exciter stator and the main generator stator windings are wound on a common stator core;

wherein the exciter rotor is configured to provide two phase excitation current to the main generator rotor windings; and wherein the main generator rotor windings have two phases.

16. The generator system of claim 15, wherein
the shaft rotates at a rotational speed provided by a prime mover; and
the main generator rotor and the exciter rotor and permanent magnet generator rotor are both disposed to rotate about the shaft.

17. The generator system of claim 16, wherein the exciter controller provides electrical excitation having a supply amplitude, a frequency, and a phase sequence in response to the rotational speed of the shaft.

18. A generator system comprising:
a housing;
a drive shaft rotationally mounted within the housing and receiving power from a prime mover, wherein the drive shaft rotates at a variable rotational speed;
a main generator stator mounted within the housing and having a plurality of main generator stator windings wound thereon;
a main generator rotor mounted on the drive shaft and disposed within the main generator stator, the main generator rotor having a plurality of main generator rotor windings wound thereon configured to receive a two-phase excitation current, wherein the main generator rotor windings generate an air gap flux upon electrical excitation thereof;
an exciter rotor mounted on the drive shaft, the exciter rotor having a plurality of exciter rotor windings wound thereon, the exciter rotor windings electrically connected to the main generator rotor windings and configured, upon electrical excitation thereof, to provide the two-phase electrical excitation to the main generator rotor windings;
an exciter stator surrounding the exciter rotor, the exciter stator having a plurality of exciter stator windings wound thereon, the exciter stator windings configured, upon electrical excitation thereof, to electrically excite the exciter rotor windings;
a speed and rotor position signal source configured to supply a speed signal representative of the rotational speed of the drive shaft; and
an exciter controller electrically coupled to the exciter stator windings and coupled to receive the speed and rotor position signal, the exciter controller configured, in response to the speed and rotor position signal, to determine the rotational speed of the shaft and to responsively supply electrical excitation to the exciter stator windings that results in the main generator rotor windings generating the air gap flux at a substantially constant, predetermined frequency, and
wherein the exciter rotor and main generator rotor are contained in a common rotor core and the exciter stator and the main generator stator are contained in a common stator core.

19. The generator system of claim 18, wherein the frequency of air gap flux is controlled in a predetermined range.

* * * * *